(12) United States Patent
Cleaves-Gregory

(10) Patent No.: US 11,272,715 B2
(45) Date of Patent: Mar. 15, 2022

(54) AQUEOUS ALMOND BASED DISPERSIONS FOR HUMAN CONSUMPTION HAVING EXTENDED SHELF LIFE

(71) Applicant: Pure Nut Mylk LLC, Sarasota, FL (US)

(72) Inventor: Vicki Leah Cleaves-Gregory, Sarasota, FL (US)

(73) Assignee: PURE NUT MYLK LLC, Sarasota, FL (US)

( * ) Notice: Subject to any disclaimer, the term of this patent is extended or adjusted under 35 U.S.C. 154(b) by 302 days.

(21) Appl. No.: 16/553,264

(22) Filed: Aug. 28, 2019

(65) Prior Publication Data

US 2020/0068913 A1 Mar. 5, 2020

Related U.S. Application Data

(60) Provisional application No. 62/725,528, filed on Aug. 31, 2018.

(51) Int. Cl.
*A23C 11/10* (2021.01)
*A23C 11/06* (2006.01)
*A23L 25/00* (2016.01)

(52) U.S. Cl.
CPC .......... *A23C 11/103* (2013.01); *A23C 11/065* (2013.01); *A23L 25/30* (2016.08)

(58) Field of Classification Search
CPC ...... A23C 11/103; A23C 11/065; A23L 25/30

USPC ................ 426/519, 632, 633, 654, 634
See application file for complete search history.

(56) References Cited

U.S. PATENT DOCUMENTS 9,220,292 B2 * 12/2015 Jenkins
2013/0316066 A1 * 11/2013 Brown et al.

FOREIGN PATENT DOCUMENTS

WO  97/10801  *  3/1997

OTHER PUBLICATIONS

Part of page for Almond Berry Smoothie, with date of 2016 of review. (Year: 2016).*
Shircliff, Alli, "Almond Berry Smoothie" recipe. (Year: 2016).*
Silk Pioneering Progress since 1977. https:silk.com/about-US/, pp. 1-4. (Year: 2010).*
Silk "unsweet Almondmilk", https://silk.com/plant-based-products/almondmilk/unsweet-almondmilk/, date taken from silk, Pioneering Progress since 1977. (Year: 2010).*

* cited by examiner

*Primary Examiner* — Helen F Heggestad
(74) *Attorney, Agent, or Firm* — Shumaker, Loop & Kendrick, LLP

(57) ABSTRACT

An almond based dispersion including water; an almond butter base homogeneously dispersed in the water; and nisin derived from a non-dairy source of *Lactococcus lactis* that is homogeneously dissolved in the water. The dispersion has a shelf life of at least 28 days and up to 45 days when stored at 4° C., maintains a pH ranging from 6.1 to 7.0 while stored, and is satisfactory for human consumption.

13 Claims, 3 Drawing Sheets

| PPM Nisin | pH | Odor | Color | Turbidity | Taste | Stable Y/N | Would Use |
|---|---|---|---|---|---|---|---|
| Day 30 | | | | | | | |
| 125 | 6.8 | good-almond | light beige | homogeneous | +++++ | Y | Y |
| 250 | 6.8 | good-almond | light beige | homogeneous | +++++ | Y | Y |
| 500 | 6.8 | good-almond | light beige | a few patches of lighter areas, had to shake again | +++++ | Y | Y |
| 750 | 6.9 | good-almond | hint darker | homogeneous | ++++++ | Y | Y |
| 1000 | 6.9 | good-almond | shade darker | homogeneous | ++++ (a little bit earthy) | Y | Y |
| Day 45 | | | | | | | |
| 125 | 6.5 | good-almond | light brown | homogeneous | +++++ | Y | Y |
| 250 | 6.5 | good-almond | light brown | homogeneous | ++++ (a little bit earthy) | Y | Y |
| 500 | 6.4 | good-almond | light brown | homogeneous | ++++ (a little bit earthy) | Y | Y |
| 750 | 6.2 | good-almond | light brown | patches-need to shake a bit more | +++ watery/slimy, less nutty, mildly astringent aftertaste | N | N |
| 1000 | 6.2 | good-almond/ earthy | light brown | patchy, need to shake twice | +++ earthy, thick and creamy but not nutty | N | N |

FIG. 1

| Day | 0 ppm Nisin | 125 ppm | 250 ppm | 500 ppm | 750 ppm | 1000 ppb |
|---|---|---|---|---|---|---|
| 1 | 142 CFU / ml | 157 CFU / ml | 260 CFU / ml | 180 CFU / ml | 190 CFU / ml | 230 CFU / ml |
| 14 | 1700 CFU / ml | 2400 CFU / ml | 1100 CFU / ml | 190 CFU / ml | 450 CFU / ml | 260 CFU / ml |
| 21 | 14,400 CFU / ml | 6100 CFU / ml | 3600 CFU / ml | 450 CFU / ml | 510 CFU / ml | 380 CFU / ml |
| 28 | 280,000 CFU / ml | 27,000 CFU / ml | 7600 CFU / ml | 990 CFU / ml | 1000 CFU / ml | 890 CFU / ml |
| 35 | 1,200,000 CFU / ml | 500,000 CFU / ml | 140,000 CFU / ml | 6000 CFU / ml | 4000 CFU / ml | 4700 CFU / ml |
| 42 | 10,000,000 CFU / ml | 7,100,000 CFU / ml | 2,000,000 CFU / ml | 700,000 CFU / ml | 12,000 CFU / ml | 10,000 CFU / ml |
| pH range | 6.0 to 6.3 | 6.2 to 6.4 | 6.1 to 6.3 | 6.1 to 6.4 | 6.2 to 6.4 | 6.1 to 6.4 |
| appearance | clear to day 28 slightly cloudy at day 35 and 42 | clear to day 35 slightly cloudy at day 42 | clear to day 35 slightly cloudy at day 42 | clear | clear | clear |

FIG. 2

| 1 cup = 240mL | Working Example | Comparative Example |
|---|---|---|
| Ave # Almonds/cup | 24 | 4 |
| % Almonds/cup | 10 | <2 |
| thickeners/gels/gums | no | yes |
| calories/cup | 160 | 30 |
| protein/cup | 6grams | 1gram |
| carbs/cup | 2grams | 1gram |
| fiber/cup | 2grams | <1gram |
| total fat/cup | 14grams | 2.5grams |

FIG. 3

AQUEOUS ALMOND BASED DISPERSIONS FOR HUMAN CONSUMPTION HAVING EXTENDED SHELF LIFE

TECHNICAL FIELD

The present invention relates generally to the field of aqueous almond based mixtures, and more particularly, to aqueous almond based dispersions (almond milk) for human consumption that includes a non-dairy derived nisin therein and has an extended shelf life.

BACKGROUND

Over the past decade and due to increased awareness of dairy allergies and lactose intolerance, almond milk has gained enormous mainstream notoriety as a viable alternative to dairy derived milk and/or dairy products. Although almond milk is a viable alternative to regular, dairy derived milk and milk products, many almond milk formulations contain trace amounts of dairy-derived products and/or countless additives including preservatives, emulsifiers (soy lecithin, etc.), and thickeners (e.g., guar gum, xanthan gum, carrageenan, etc.), which have been implicated in potentially playing a role and/or triggering endogenous inflammatory pathways/processes and/or several chronic inflammatory diseases. Thus, problems exist with the currently known almond milk formulations, and there is a need for a viable alternative to the existing formulations.

SUMMARY

In view of the existing almond milk formulations, it is desirable to provide a simplified almond milk formulation that is substantially free of any dairy and/or dairy derived products and countless additives such as preservatives, emulsifiers (soy lecithin, etc.), and thickeners (e.g., guar gum, xanthan gum, carrageenan, etc.). Thus, disclosed are aqueous almond based dispersion(s) including water; an almond butter base homogeneously dispersed in the water; and nisin derived from a non-dairy source of *Lactococcus lactis* that is homogeneously dissolved in the water, wherein the dispersion has a shelf life of up to 45 days when stored at 4° C., maintains a pH ranging from 5.5 to 7.0 (or from 6.1 to 7.0) while stored, and is satisfactory for human consumption. The aqueous almond based dispersion(s) disclosed herein preferably exhibit a shelf life of from at least 28 days and up to 45 days (when stored at from 2° C. to 5° C., preferably 4° C.) depending on nisin concentration, more preferably from at least 28 days and up to 40 days (when stored at from 2° C. to 5° C., preferably 4° C.), and most preferably from at least 28 days and up to 35 days (when stored at from 2° C. to 5° C., preferably 4° C.) when nisin is present in the almond based dispersion at an overall concentration ranging from 250 ppm to 500 ppm. Also, in this aspect, pH is maintained within the pH range of from 6.0 to 6.5 and more preferably from 6.1 to 6.4 for at least 28 days and up to 45 days (when stored at from 2° C. to 5° C., preferably 4° C.) depending on nisin concentration, more preferably from at least 28 days and up to 40 days (when stored at from 2° C. to 5° C., preferably 4° C.), and most preferably from at least 28 days and up to 35 days (when stored at from 2° C. to 5° C., preferably 4° C.). The disclosed almond based dispersions preferably replicate the taste of freshly made, homemade almond milk while concurrently maintaining shelf life for commercial distribution.

In certain aspects, the aqueous almond based dispersion does not include any dairy products and/or any dairy-derived products.

In certain aspects, the almond butter base comprises at least one of a pasteurized almond butter base, a blanched almond butter base, a roasted almond butter base, a pasteurized blanched almond butter base, a pasteurized roasted almond butter base, a steam pasteurized blanched almond butter base, or a steam pasteurized roasted almond butter base.

In certain aspects, the concentration of the almond butter base ranges from 3% to 12% volume % (more preferably 8% to 11% volume %) of the overall weight of the aqueous almond based dispersion. In certain aspects, the almond butter base ranges from 9.5% to 10.5% volume %.

In certain aspects, the concentration of the nisin ranges from 250 ppm to 1000 ppm of the overall weight of the aqueous almond based dispersion and more preferably ranges from 250 ppm to 750 ppm, and most preferably ranges from 250 ppm to 500 ppm.

In certain aspects, the dispersion further includes an alkali metal salt, an alkaline earth metal salt, or a combination thereof with the alkali metal salt, the alkaline earth metal salt, or a combination thereof is present in the aqueous almond based dispersion at a concentration ranging from 0.0625 wt % to 0.08 wt % of the aqueous almond based dispersion.

In another aspect, disclosed is an aqueous almond based dispersion consisting essentially of water; an almond butter base homogeneously dispersed in the water; nisin derived from a non-dairy source of *Lactococcus lactis* that is homogeneously dissolved in the water; and a salt comprising at least one of an alkali metal salt and/or an alkaline earth metal salt, wherein the dispersion has a shelf life of up to 45 days when stored at 4° C., maintains a pH ranging from 5.5 to 7.0 while stored, and is satisfactory for human consumption. In this aspect, nisin is present in the dispersion at a concentration ranging from 250 ppm to 500 ppm of the overall weight of the aqueous almond based dispersion. The aqueous almond based dispersion(s) disclosed herein preferably exhibit a shelf life of from at least 28 days and up to 45 days (when stored at from 2° C. to 5° C., preferably 4° C.) depending on nisin concentration, more preferably from at least 28 days and up to 40 days (when stored at from 2° C. to 5° C., preferably 4° C.), and most preferably from at least 28 days and up to 35 days (when stored at from 2° C. to 5° C., preferably 4° C.) when nisin is present in the almond based dispersion at an overall concentration ranging from 250 ppm to 500 ppm. Also, in this aspect, pH is maintained within the pH range of from 6.0 to 6.5 and more preferably from 6.1 to 6.4 for at least 28 days and up to 45 days (when stored at from 2° C. to 5° C., preferably 4° C.) depending on nisin concentration, more preferably from at least 28 days and up to 40 days (when stored at from 2° C. to 5° C., preferably 4° C.), and most preferably from at least 28 days and up to 35 days (when stored at from 2° C. to 5° C., preferably 4° C.).

Also disclosed is an aqueous almond based dispersion consisting of water; an almond butter base homogeneously dispersed in the water; nisin derived from a non-dairy source of *Lactococcus lactis* that is homogeneously dissolved in the water; and a salt comprising at least one of an alkali metal salt and/or an alkaline earth metal salt, wherein the dispersion has a shelf life of up to 45 days when stored at 4° C., maintains a pH ranging from 5.5 to 7.0 while stored, and is satisfactory for human consumption. In this aspect, nisin is present in the dispersion at a concentration ranging from 250 ppm to 500 ppm of the overall weight of the aqueous almond based dispersion. The aqueous almond based dispersion(s) disclosed herein preferably exhibit a shelf life of from at least 28 days and up to 45 days (when stored at from 2° C. to 5° C., preferably 4° C.) depending on nisin concentration, more preferably from at least 28 days and up to 40 days (when stored at from 2° C. to 5° C., preferably 4° C.), and most preferably from at least 28 days and up to 35 days (when stored at from 2° C. to 5° C., preferably 4° C.) when nisin is present in the almond based dispersion at an overall concentration ranging from 250 ppm to 500 ppm. Also, in this aspect, pH is maintained within the pH range of from 6.0 to 6.5 and more preferably from 6.1 to 6.4 for at least 28 days and up to 45 days (when stored at from 2° C. to 5° C., preferably 4° C.) depending on nisin concentration, more preferably from at least 28 days and up to 40 days (when stored at from 2° C. to 5° C., preferably 4° C.), and most preferably from at least 28 days and up to 35 days (when stored at from 2° C. to 5° C., preferably 4° C.).

Further disclosed is a method of making an aqueous almond based dispersion for human oral consumption, the method comprising: (a) providing a predetermined volume of water; (b) heating the water of step (a) to a temperature ranging from ~65° C.~79° C.; (c) adding an almond butter base to the heated water of step (b) and mixing the almond butter base thereby forming a homogeneous dispersion of the almond butter base in the water; (d) adding either during step (c) or after step (c) nisin from a non-dairy source of *Lactococcus lactis* and homogeneously dissolving the nisin, thereby forming the aqueous almond based dispersion; and (e) after step (d) aliquoting a predetermined volume of the of the aqueous almond based dispersion into a sterile container and sealing the almond based dispersion therein for subsequent human consumption, wherein: the dispersion has a shelf life of up to 45 days when stored at 4° C., maintains a pH ranging from 5.5 to 7.0 while stored, and is satisfactory for human consumption. In certain aspects, the aqueous almond based dispersion(s) made according to the method above preferably exhibit(s) a shelf life of from at least 28 days and up to 45 days (when stored at from 2° C. to 5° C., preferably 4° C.) depending on nisin concentration, more preferably from at least 28 days and up to 40 days (when stored at from 2° C. to 5° C., preferably 4° C.), and most preferably from at least 28 days and up to 35 days (when stored at from 2° C. to 5° C., preferably 4° C.) when nisin is present in the almond based dispersion at an overall concentration ranging from 250 ppm to 500 ppm. Also, in this aspect, pH is maintained within the pH range of from 6.0 to 6.5 and more preferably from 6.1 to 6.4 for at least 28 days and up to 45 days (when stored at from 2° C. to 5° C., preferably 4° C.) depending on nisin concentration, more preferably from at least 28 days and up to 40 days (when stored at from 2° C. to 5° C., preferably 4° C.), and most preferably from at least 28 days and up to 35 days (when stored at from 2° C. to 5° C., preferably 4° C.).

In certain aspects and while making the aqueous almond based dispersion, the aqueous almond based dispersion does not include any dairy products and/or any dairy-derived products.

In certain aspects and while making the aqueous almond based dispersion, the almond butter base comprises at least one of a pasteurized almond butter base, a blanched almond butter base, and/or a roasted almond butter base.

In certain aspects, the concentration of the almond butter base ranges from 5% to 12% volume % of the overall weight of the aqueous almond based dispersion.

In certain aspects, the concentration of the nisin ranges from 250 ppm to 1000 ppm of the overall weight of the aqueous almond based dispersion and more preferably ranges from 250 ppm to 750 ppm, and most preferably ranges from 250 ppm to 500 ppm.

In certain aspects, the aqueous almond based dispersion includes an alkali metal salt, an alkaline earth metal salt, or a combination thereof.

In certain aspects, the alkali metal salt, the alkaline earth metal salt, or a combination thereof is present in the aqueous almond based dispersion at a concentration ranging from 0.0625 wt % to 0.08 wt % of the aqueous almond based dispersion.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which:

FIG. 1 depicts results including pH, odor, color, turbidity/homogeneity and taste obtained from testing exemplary aqueous almond based dispersions disclosed herein that included various concentrations of nisin (e.g., 125 ppm, 250 ppm, 500 ppm, 750 ppm, and 1000 ppm) after 30 days and 45 days of storage at 4° C.

FIG. 2 depicts a shelf life study obtained from testing exemplary aqueous almond based dispersions disclosed herein that included various concentrations of nisin (e.g., 0 ppm, 125 ppm, 250 ppm, 500 ppm, 750 ppm, and 1000 ppm) after 1 day, 14, days, 21 days, 28 days, 35 days, and 45 days respectively when stored at 2° C. to 5° C.; and FIG. 3 depicts the differences between an exemplary aqueous almond based dispersion (Working Example) as disclosed herein when compared with a conventional, currently marketed almond based dispersion/almond milk formulation (Comparative Example).

DETAILED DESCRIPTION

The present invention will now be described more fully hereinafter. It is to be understood that the aspects described below are not limited to specific compounds, synthetic methods, or uses as such may, of course, vary. It is also to be understood that the terminology used herein is for the purpose of describing particular aspects only and is not intended to be limiting. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention.

In this specification and in the claims that follow, reference will be made to a number of terms that shall be defined to have the following meanings:

It must be noted that, as used in the specification and the appended claims, the singular forms "a," "an" and "the" include plural referents unless the context clearly dictates otherwise.

"Optional" or "optionally" means that the subsequently described event or circumstance can or cannot occur, and that the description includes instances where the event or circumstance occurs and instances where it does not.

As used herein, the term "about" is used to provide flexibility to a numerical range endpoint by providing that a given value may be "slightly above" or "slightly below" the endpoint without affecting the desired result.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within the ranges as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. as well as 1, 2, 3, 4, and 5, individually. The same principle applies to ranges reciting only one numerical value as a minimum or a maximum. Furthermore, such an interpretation should apply regardless of the breadth of the range or the characteristics being described.

Disclosed are an almond milk formulations/aqueous almond dispersions that are substantially free of any dairy and/or dairy derived products and countless additives (e.g., emulsifiers such as soy lecithin, thickeners such as guar gum, xanthan gum, carrageenan, etc) while concurrently and advantageously having an extended shelf life, especially in view of currently marketed almond milk formulation(s). Specifically disclosed are aqueous almond based dispersion(s) including water at a predetermined volume; an almond butter base homogeneously dispersed in the water; and nisin derived from a non-dairy source of *Lactococcus lactis* that is also homogeneously dissolved in the water. The dispersion has a shelf life of up to 28 days, up to 35 days, up to 45 days, more preferably up to 55 days, and most preferably up to 70 days when stored at temperatures ranging from 1° C. to 8° C. (preferably 4° C. to 5° C.) and maintains a pH ranging from 5.5 to 7.2, and more preferably from 6.1 to 7.0 while stored, and is satisfactory for human consumption. The aqueous almond based dispersion(s) disclosed herein preferably exhibit a shelf life of from at least 28 days and up to 45 days (when stored at from 2° C. to 5° C., preferably 4° C.) depending on nisin concentration, more preferably from at least 28 days and up to 40 days (when stored at from 2° C. to 5° C., preferably 4° C.), and most preferably from at least 28 days and up to 35 days (when stored at from 2° C. to 5° C., preferably 4° C.) when nisin is present in the almond based dispersion at an overall concentration ranging from 250 ppm to 500 ppm. Also, in this aspect, pH is maintained within the pH range of from 6.0 to 6.5 and more preferably from 6.1 to 6.4 for at least 28 days and up to 45 days (when stored at from 2° C. to 5° C., preferably 4° C.) depending on nisin concentration, more preferably from at least 28 days and up to 40 days (when stored at from 2° C. to 5° C., preferably 4° C.), and most preferably from at least 28 days and up to 35 days (when stored at from 2° C. to 5° C., preferably 4° C.).

The almond butter base includes at least one of a pasteurized almond butter base, a blanched almond butter base, a roasted almond butter base, a pasteurized blanched almond butter base, a pasteurized roasted almond butter base, a steam pasteurized blanched almond butter base, or a steam pasteurized roasted almond butter base. Almond butter/almond butter base is particularly preferred when making the disclosed compositions herein due to its ease of mixing within the disclosed dispersions while also advantageously maintaining a majority of the almond's nutrients (e.g., fiber, protein, etc.). Alternatively, if almond butter is not used and a "soak and strain" method of providing the almond base is used, nutrients may be lost while straining the pulp, and for this reason, the above mentioned almond butter base is preferred in the dispersions disclosed herein. In certain aspects, the concentration of the almond butter base ranges from 3% to 12% weight/volume of the overall weight of the aqueous almond based dispersion, and most preferably ranges from 8% to 11 weight/volume of the overall weight of the aqueous almond based dispersion.

As discussed above, nisin is further included in the disclosed dispersions. Nisin is a polycyclic antibacterial peptide produced by the *Lactococcus lactis* and has the chemical formula of $C_{143}H_{230}N_{42}O_{37}S_7$. The concentration of the nisin ranges from 125 ppm to 1000 ppm (e.g., 125 ppm, 250 ppm, 500 ppm, 750 ppm, and 1000 ppm) of the overall weight of the aqueous almond based dispersion. In certain preferred aspects, nisin concentrations within the aqueous almond based dispersions range from 250 ppm to 500 ppm because shelf life may be maximized (i.e., maintaining desired pH range(s), maintaining shelf life from at least 28 days to 45 days when stored from 2° C. to 5° C. (preferably 4° C.), while minimizing bacterial growth/spoilage (maintaining less than 12,000 CFU/ml)) at these concentrations. In certain aspects, using nisin concentrations less than 250 ppm in the disclosed aqueous almond based dispersions exhibited variable results such as inconsistent and reduced shelf life associated with increased bacterial growth/spoilage. While in certain aspects, using nisin at concentrations above 500 ppm in the disclosed aqueous almond based dispersions may have negligible effects on the dispersion's shelf life and may merely add to production costs while providing no additional (and/or only a negligible) benefit.

In certain aspects, the dispersion further includes an alkali metal salt, an alkaline earth metal salt, or a combination thereof with the alkali metal salt, the alkaline earth metal salt, or a combination thereof is present in the aqueous almond based dispersion at a concentration ranging from 0.0625 wt % to 0.08 wt % of the aqueous almond based dispersion. In certain specific examples, sodium chloride, potassium chloride, and/or calcium chloride may be included in the dispersion. In general, the combination of water volume, almond butter base, nisin, and salt(s) disclosed herein synergistically interact with one another to maintain pH between 5.8 to 7.2 and more preferably from 6.0 to 6.9 for a period of up to 35 days, more preferably up to 45 days, even more preferably up to 55 days, and most preferably up to 70 days, and as further shown in FIG. 1 and Table, further advantageously maintain desirable odor, color, turbidity, and taste.

Also disclosed is a method of making an aqueous almond based dispersion for human oral consumption, the method includes (a) providing a predetermined volume of water (e.g., preferably sterilized and/or filtered water); (b) heating the water of step (a) to a temperature ranging from ~65° C.~79° C.; (c) adding an almond butter base to the heated water of step (b) and mixing the almond butter base thereby forming a homogeneous dispersion of the almond butter base in the water; (d) adding either during step (c) or after step (c) nisin from a non-dairy source of Lactococcus lactis and homogeneously dissolving the nisin, thereby forming the aqueous almond based dispersion; and (e) after step (d) aliquoting a predetermined volume of the aqueous almond based dispersion into a sterile container and sealing the almond based dispersion therein for subsequent human consumption, wherein: the dispersion has a shelf life of up to 45 days when stored at 4° C., maintains a pH ranging from 6.1 to 7.0 while stored, and is satisfactory for human consumption. In certain aspects and after step (d) but before step (e), the aqueous almond based dispersion is allowed to cool (e.g., with the use of cooling baths, etc.) below 70° F. (e.g., between 60° F. to 70° F.) before aliquoting into the appropriate containers.

In certain aspects and while making the aqueous almond based dispersion, the aqueous almond based dispersion does not include any dairy products and/or any dairy-derived products.

The almond based dispersions disclosed herein can be packaged into sterile containers and subsequently sealed for storage at the desired temperature (e.g., 1° C. to 8° C.) during the disclosed storage time periods (e.g., up to 70 days) and may remain satisfactory for human consumption.

The compositions and methods described herein can comprise, consist of, or consist essentially of the essential elements and limitations described herein, as well as any additional or optional ingredients, components, or limitations described herein.

It is understood that any given particular aspect of the disclosed compositions and methods can be easily compared to the specific examples and embodiments disclosed herein. By performing such a comparison, the relative efficacy of each particular embodiment can be easily determined. Particularly preferred compositions and methods are disclosed in the Examples herein, and it is understood that these compositions and methods, while not necessarily limiting, can be performed with any of the compositions and methods disclosed herein.

Working Examples

Producing Exemplary Aqueous Almond Based Dispersion(s)

Different exemplary, aqueous almond based dispersion(s) were prepared having different concentrations of Nisin T (also referred to herein as fermented Lactococcus lactis (FLL)) to determine optimum concentrations for shelf life.

A proof of concept preliminary study was conducted with Nisin T (FLL) at a concentration of 250 ppm (or 0.025% w/vol of FLL) in the almond milk (aqueous almond based dispersion) with the requirement that these dispersion(s) exhibit stability for at least 35 days post-production and storage. This proof of concept preliminary study was conducted and confirmed by an independent lab (as discussed in further detail below in the section entitled "Shelf Life Study"). After obtaining successful results in the proof of concept preliminary study, an additional study was conducted, which expanded Nisin concentrations in the disclosed dispersions. Specifically, dispersions having concentrations of Nisin T at 125 ppm, 250 ppm, 750 ppm, and 1000 ppm were further prepared and analyzed. Procedures for preparing the dispersion are summarized below.

1 gram of FLL (Nisin T) per 1 liter of almond milk will yield the 0.025% w/vol or 250 ppm solution. Various concentrations of almond milk having FLL concentrations of 125 ppm, 250 ppm, 500 ppm, 750 ppm and 1000 ppm were prepared. Using a Gemini-20 portable milligram scale, 1 gram of FLL was weighed out, and determined this weight to equal just under approximately ½ teaspoonful. For the purposes of measuring the FLL we used ½ tsp=1 gram, 1 tsp=2 grams, etc. For each concentration of FLL we had a final volume of 2 L therefore we would need 1 gram (½ tsp) of FLL for 2 L of the 125 ppm solution, 2 grams (1 tsp) of FLL for 2 L of 250 ppm, 4 grams (2 tsp) of FLL for 2 L of 500 ppm, 6 grams (3 tsp) of FLL for 2 L of 750 ppm, and 8 grams (4 tsp) of FLL for 2 L of 1000 ppm. Five different FLL concentrations of almond milk solutions were evaluated for stability at 45, 50, 55 and 60 days post-production of each solution. To determine stability, we evaluated pH, odor, color, turbidity and taste. We then noted whether or not the particular solution would be suitable as a product for consumers.

To begin making the aqueous almond based dispersion, 2.5 liters of filtered water was heated to ~65° C.~79° C. In a blender, we added ¾ cup (~10% vol % of final concentration) of 100% pure blanched almond butter (Provided by Treehouse Almonds), ¼ tsp himalayan sea salt (final concentration is 0.0625 wt %), and ½ tsp FLL which would yield a concentration of 125 ppm. Once the water was within the desired temperature range (~65° C.~79° C.) 1.8 liters of the heated water were added to the blender, and blended on low speed (~3500 RPMs) for 5 mins. The blended almond milk solution was then poured into a 1 gallon container ("bulk solutions/dispersions") and placed in the refrigerator to cool. This process was repeated for the 4 other concentrations, using 1 tsp FLL for the 250 ppm, 2 tsp for the 500 ppm, 3 tsp for the 750 ppm and 4 tsp for the 1000 ppm solutions/dispersion.

All bulk dispersions/solutions were placed in the refrigerator at 4° C. to cool overnight. The next day, all solutions had temperatures under 4° C. and were ready to be bottled. Prior to bottling, the almond milk solutions were stirred continuously for 1 minute to ensure all ingredients were evenly/homogeneously distributed. Five bottles for each of the 5 concentrations were labeled with the corresponding concentration and the day to test (125-30, 125-45, 125-50 etc.). The almond milk solution was then poured into the appropriate bottle and sealed. These dispersions/solutions were tested for up to 45 days, and as further shown in FIG. 1, each concentration maintaining pH, color, and odor.

First Shelf Life Study

As indicated immediately above in this Working Examples section, a quantitative shelf life study was performed on the aqueous almond based dispersions (i.e., Almond Milk with added Nisin at 250 ppm) by an independent laboratory (Toxin Technology, Inc. in Sarasota, Fla.) immediately upon receipt (Day 1), then once a week for the next five weeks (Day 7 through Day 35). For this study, the Almond Milk was stored at 4° C.

"Day 1" and "Day 28" testing consisted of pH, Aerobic Plate Counts (APC), Salmonella, E. coli, and Listeria. Testing on all other days consisted of pH and APC. All testing was performed in duplicate and followed FDA BAM procedures. For the APC, results are reported as "Colony Forming Units per milliliter" (CFU/ml). Results of this study are summarized below in Table 1, which are as follows:

TABLE 1

| Testing | pH | APC Count | Observations/Organoleptic Evaluation |
| --- | --- | --- | --- |
| Day 1 | 6.02 | 80 CFU/ml | Texture smooth and uniform, odor - OK |
| Day 7 | 6.04 | 100 CFU/ml | Texture smooth and uniform, odor - OK |
| Day 14 | 6.15 | 110 CFU/ml | Texture smooth and uniform, odor, taste - OK |
| Day 21 | 6.15 | 140 CFU/ml | Texture smooth and uniform, odor, taste - OK |
| Day 28 | 6.08 | 140 CFU/ml | Texture smooth and uniform, odor, taste - OK |
| Day 35 | 6.11 | 630 CFU/ml | Texture smooth and uniform, odor, taste - OK |

Based on the stable pH, low APC, and product's consistent sensory evaluation results (appearance, odor, taste), the almond milk product was stable for at least 35 days when stored at 4° C. No pathogens (*Listeria, Salmonella*, fecal coliforms/*E. coli*) were detected.

Second Shelf Life Study

A second shelf life study was performed on another lot of the aqueous almond based dispersions (i.e., Almond Milk with Nisin added/dissolved therein at concentrations of 0 ppm, 125 ppm, 250 ppm, 500 ppm, 700 ppm, and 1000 ppm) by an independent laboratory (Toxin Technology, Inc. in Sarasota, Fla.) immediately upon receipt (Day 1) and then after storage at 2 to 5° C. for 14 days, 21, days, 28 days, 35 days, and 42 days.

On the days indicated in FIG. 2 (i.e., day 1, 14, 21, 28, 35, and 42), the aqueous almond based dispersions were tested for aerobic plate count (APC) and acidity (pH). The physical appearance was also noted. A table of all data collected during this study is shown in FIG. 3. Each dispersion shown in FIG. 3 were tested for presence of fecal coliforms, *Salmonella*, and *Listeria* at the beginning and end of this study with all results for these pathogens were negative.

Based on the data in FIG. 2, the aqueous almond dispersions with Nisin concentrations of 500 ppm (and higher) demonstrated good control of bacterial growth and bacteria related spoilage to at least 35 days (and in some instances up to 42 days). The aqueous almond dispersions with Nisin concentration of 250 ppm showed good control to at least 28 days and up to 35 days wherein bacterial growth and spoilage was controlled over this time period. The fluctuation(s) between data shown in Table 1 and FIG. 2 (e.g., the aqueous almond based dispersions having 250 ppm nisin) can be attributed to several different variables including higher and/or lower initial CFU(s) in the different samples/lots, slightly varied pH, along with slightly variable storage temperatures (i.e., fluctuations between 2 to 5° C. in the second study versus a constant 4° C. in the first study). Overall, the second shelf life study demonstrates that the aqueous almond based dispersions having concentrations of 250 ppm to 500 ppm exhibited the greatest overall shelf life for a time period of up to at 35 days (and in some instances up to 42 days). At lower concentrations of nisin (i.e., less than 250 ppm), shelf life was compromised after 21 days, and at nisin concentrations higher than 500 ppm, no clear benefit was observed.

Exemplary Aqueous Almond Based Dispersion Compared with Conventional Formulation FIG. 3 specifically shows an exemplary aqueous almond based dispersion (Working Example) as disclosed herein when compared with a conventional, currently marketed almond based dispersion/almond milk. (Comparative Example). The exemplary aqueous almond based dispersion (Working Example) in FIG. 3 was prepared (as disclosed above) and was compared to a conventional, currently marketed almond based dispersion/almond milk. (Comparative Example).

As shown in FIG. 3, the Working Example includes an increased concentration of almonds within the dispersion by approximately six-fold when compared to the Comparative Example. The Working Example further includes approximately a six-fold higher protein and fat concentrations and at least a two-fold higher concentration in fiber. In addition, the Working Example only contains 4 ingredients, compared to a paragraph of ingredients with other available products. Because of the high almond concentration in the Working Example, no gels, gums, and/or thickeners are included and/or needed. The omission of gels, gums, and/or thickeners from the aqueous almond based dispersions are particularly advantageous since gels, gums, and/or thickeners have been indicated to trigger and/or play a role in endogenous inflammatory pathways and several chronic diseases. The Working Example shown in FIG. 3 can be used as a clean label, non-inflammatory dairy alternative in coffee/tea, cereals, smoothies, baking, or alone as a meal supplement.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. An aqueous almond based dispersion consisting essentially of:
   (a) water;
   (b) an almond butter base homogeneously dispersed in the water; and
   (c) nisin derived from a non-dairy source of *Lactococcus lactis* that is homogeneously dissolved in the water and is present in the dispersion at a concentration ranging from 250 ppm to 1000 ppm of the overall weight of the aqueous almond based dispersion; and
   (d) an alkali metal salt and/or an alkaline earth metal salt, present in the almond based dispersion at a concentration ranging from 0.0625 wt % to 0.08 wt % of the aqueous almond based dispersion, wherein:
       the dispersion has a shelf life of at least 28 days and up to 45 days when stored at 4° C., maintains a pH ranging from 5.5 to 7.0 while stored, and is satisfactory for human consumption while stored.

2. The aqueous almond based dispersion of claim 1, wherein the almond based dispersion does not include any dairy products and/or any dairy-derived products.

3. The aqueous almond based dispersion of claim 2, wherein concentration of the almond butter base ranges from 5% to 12% volume % of the overall weight of the aqueous almond based dispersion.

4. The aqueous almond based dispersion of claim 3, wherein concentration of the nisin ranges from 250 ppm to 500 ppm of the overall weight of the aqueous almond based dispersion.

5. The aqueous almond based dispersion of claim 1, wherein the almond butter base comprises at least one of a pasteurized almond butter base, a blanched almond butter base, and/or a roasted almond butter base.

6. The aqueous almond based dispersion of claim 1, wherein concentration of the nisin ranges from 250 ppm to 750 ppm of the overall weight of the aqueous almond based dispersion.

7. The aqueous almond based dispersion of claim 1, wherein
the dispersion has a shelf life of at least 28 days and up to 45 days when stored at 4° C., maintains a pH ranging from 6.1 to 6.5 while stored, and is satisfactory for human consumption while stored.

8. A method of making the aqueous almond based dispersion for human oral consumption of claim 1, the method comprising:
(a) providing a predetermined volume of water;
(b) heating the water of step (a) to a temperature ranging from ~65° C.~79° C.;
(c) adding an almond butter base to the heated water of step (b) and mixing the almond butter base thereby forming a homogeneous dispersion of the almond butter base in the water;
(d) adding either during step (c) or after step (c) nisin from a non-dairy source of *Lactococcus lactis* and homogeneously dissolving the nisin, thereby forming the aqueous almond based dispersion; and
(e) after step (d) aliquoting a predetermined volume of the aqueous almond based dispersion into a sterile container and sealing the aqueous almond based dispersion therein for subsequent human consumption, wherein:
the dispersion has a shelf life of at least 28 days and up to 45 days when stored at 4° C., maintains a pH ranging from 6.1 to 7.0 while stored, and is satisfactory for human consumption.

9. The method of claim 8, wherein the aqueous almond based dispersion does not include any dairy products and/or any dairy-derived products.

10. The method of claim 9, wherein the almond butter base comprises at least one of a pasteurized almond butter base, a blanched almond butter base, and/or a roasted almond butter base.

11. The method of claim 10, wherein concentration of the almond butter base ranges from 5% to 12% volume % of the overall weight of the almond based dispersion.

12. The method of claim 11, wherein concentration of the nisin ranges from 250 ppm to 500 ppm of the overall weight of the aqueous almond based dispersion.

13. An aqueous almond based dispersion consisting of:
(a) water;
(b) an almond butter base homogeneously dispersed in the water;
(c) nisin derived from a non-dairy source of *Lactococcus lactis* that is homogeneously dissolved in the water and is present in the dispersion at a concentration ranging from 250 ppm to 750 ppm of the overall weight of the aqueous almond based dispersion; and
(d) a salt comprising at least one of an alkali metal salt and/or an alkaline earth metal salt, wherein:
the dispersion has a shelf life of at least 28 days and up to 45 days when stored at 4° C., maintains a pH ranging from 6.1 to 6.5 while stored, and is satisfactory for human consumption while stored.

* * * * *